Patented May 1, 1945

2,375,164

UNITED STATES PATENT OFFICE 2,375,164

RECOVERY OF BETAINE AND BETAINE SALTS FROM SUGAR BEET WASTES

Arthur N. Bennett, Denver, Colo., assignor to The Great Western Sugar Company, Denver, Colo., a corporation of New Jersey No Drawing. Application February 17, 1942, Serial No. 431,276

11 Claims. (Cl. 260—527)

This invention relates to new and useful improvements in the recovery of betaine and betaine salts from sugar beet wastes.

Betaine is a basic nitrogenous organic compound, tri-methyl glycocoll, which is found in sugar beets. It crystallizes with one molecule of water, as betaine hydrate, having the formula $C_5H_{11}O_2N.H_2O$. Being soluble in water, betaine is extracted from sugar beets, along with the sugar and other compounds, in the process of producing sugar from beets. The betaine so extracted is not eliminated during the purification of the beet juice or the production of sugar from the juice, so that it accumulates in the final molasses. In the further recovery of sugar from final molasses, by the well known Steffen process or barium process, the betaine remains in solution in the final mother liquor, which is known in the beet sugar industry as "waste water." Besides betaine, this waste water contains various other substances, including amino acids and other nitrogenous compounds, sugar and other carbohydrates, and inorganic compounds (ash) such as potassium and sodium salts. The following is a typical analysis of a Steffen waste water:

| Constituents | Percentage of dry matter |
|---|---|
| Betaine | 15–18 |
| Ash | 40–45 |
| Other nitrogen compounds | 30–35 |
| Carbohydrates | 10–20 |

The methods heretofore used for the recovery of betaine have generally involved preliminary concentration of Steffen or barium process waste water, followed, either directly or after an alcohol extraction to concentrate the betaine, by treatment with an excess of acid to form an acid salt of betaine and acid salts of inorganic impurities and thus enable selective crystallizations and separations for the recovery of a somewhat impure acid salt of betaine as the product. Such methods variously specify the use of hydrogen chloride gas, hydrochloric acid, sulfuric acid, phosphoric acid, etc., for the acid treatment. The yield of betaine or betaine salt is about 75% to 80% of the betaine in the original solution.

In one of such methods, the concentrated waste water is saturated with hydrogen chloride gas to convert the sodium and potassium compounds to their respective chlorides and the betaine to betaine hydrochloride. Upon evaporation, the alkali chlorides crystallize first and are removed, whereupon the evaporation is continued to crystallize betaine hydrochloride, together with some of the remaining alkali chlorides. This method is hazardous and disagreeable to workmen, and it requires costly acid-proof equipment and an excessive amount of costly hydrogen chloride gas.

In another method the betaine, together with various other substances in lesser degree, is extracted from the concentrated waste water by means of ethyl alcohol to obtain an alcoholic extract containing as high as 40% to 45% of betaine on dry matter. This extract is treated with an excess of acid, usually hydrochloric acid, to form corresponding acid salts with betaine and inorganic impurities. The betaine salt is less soluble than betaine and hence crystallizes out of solution, along with some alkali salts and other impurities. By recrystallization a purer product is obtained, but it is difficult to obtain a quite pure product, even by repeated crystallizations. This method also has other disadvantages, particularly in that it requires acid-proof equipment, that the acid reacts with organic matter to form humus-like substances which interfere with the separation, and that a large excess of acid over that needed for the reaction with betaine is required.

An object of the present invention is to provide a new and improved process for the production of betaine or acid salts of betaine from sugar beet wastes.

Another object is to provide such a process which gives a high yield of substantially pure betaine or betaine salt and yet is free from the above mentioned disadvantages of methods heretofore used.

A further object of the invention is to provide processes for converting impure betaine containing solutions into comparatively pure solutions from which a high yield of substantially pure betaine or acid salt of betaine may be readily obtained.

Still another object is to provide processes for the preparation of betaine and betaine salts wherein impure betaine solutions are purified and then subjected to successive crystallizations and separations for the production (1) of a substantially pure crystalline product, (2) of one or more crystalline products of somewhat lower purity and (3) of a low purity mother liquor separated from the least pure of the products, and wherein the impure products and the mother liquor may be continually recirculated and retreated in the process so as to maintain a high production yield of the pure product.

These and various other objects, features and advantages of my invention will appear more fully from the following description of preferred embodiments thereof, while the new practices comprehended by the invention are defined particularly in the appended claims.

I have discovered that a certain class of chemical substances known as cation exchange materials, particularly hydrogen exchange materials which adsorb basic ions from solutions and replace them by hydrogen ions, act as selective adsorbents when brought into contact with impure aqueous solutions of betaine, such that the material will first adsorb betaine and some inorganic cations from the solution and next will adsorb a higher concentration of inorganic cations and thereupon release and return the previously adsorbed betaine to the solution. When an impure aqueous solution containing betaine and alkali metal salts is passed through a bed or column of granular hydrogen exchange material, this action takes place progressively from the inlet to the outlet ends of the bed, and an effluent emerges from the bed which is made up of several distinct and successive, though not sharply defined, portions or zones, one of which has a very high betaine purity. Following this betaine-rich portion the bed yields solution that is somewhat enriched in betaine but has an increasing content of inorganic cations, and the effluent following that becomes of approximately the same composition as the original feed solution, which signifies that the bed of exchanger material has accomplished its function and become substantially saturated with basic ions.

According to this invention, therefore, I take a suitable aqueous solution containing betaine and organic and inorganic impurities, such as a solution prepared from sugar beet waste water in the manner hereinafter described, and I pass such solution through one or more beds of granular hydrogen exchange material and observe and divide the effluent from each bed into separate fractions, according to its changing qualities, so as to obtain a betaine-rich fraction that has a very high betaine purity but contains very little of the inorganic cations present in the original solution. This betaine-rich fraction is quite acid, due to the release therein of acid radicals previously associated with the cations removed by the exchanger material, but it may be treated readily, as hereinafter described, for the economical production of substantially pure betaine or acid salts of betaine. By a suitable succession of such cation exchange treatments and fractionations a recovery of such betaine-rich fractions may be obtained which contains nearly all of the betaine present in the original solution, so that a very high yield of substantially pure betaine or betaine salt may be secured.

In practice pursuant hereto, a fresh watered bed of granular hydrogen exchange material is provided, e. g. a bed containing wash water left after a regeneration treatment, and a suitable aqueous betaine-containing solution, such as a solution prepared from sugar beet waste water in the manner hereinafter described, is fed into and through the bed so as to displace the water and then pass in contact with the exchanger material. The first portion of the resulting effluent consists mainly of displaced water and acidic solution from which betaine and metallic cations have been removed. Next, solution of high betaine purity begins to flow from the bed, and this is taken off separately. After a while, the content of alkali metal cations, or ash, in the effluent begins to increase substantially, whereupon the collection of the betaine-rich fraction is terminated and the flow is continued to obtain a less pure fraction somewhat enriched in betaine but containing an objectionable proportion of alkali. Finally, the effluent becomes of approximately the same composition as the feed solution, and at that point the feed to the exhausted bed is discontinued and steps are taken to recover the residual solution from the bed and then regenerate the bed for further use.

The betaine-rich fraction isolated from the effluent is ready for further treatment as hereinafter described. The somewhat enriched fraction next isolated preferably is passed from the original bed through another bed of fresh hydrogen exchange material, with or without the addition of solution that has not been enriched, to produce another betaine-rich fraction for further treatment in the same manner as the betaine-rich fraction first recovered.

According to one embodiment of my invention, substantially pure betaine is produced from Steffen or barium waste water by a series of treatments substantially as follows: The waste water is first concentrated in the usual manner and then subjected to an alcohol extraction, preferably with ethyl alcohol or suitable denatured alcohol, to obtain an extract of considerably greater betaine purity than the original waste water. Other solvent alcohols, such as iso-propyl and butyl alcohols, may be used. The alcohol is then removed from the extract by distillation, whereupon the de-alcoholized extract is diluted with water to form a still impure aqueous solution, containing betaine and ash, that is suitable for treatment with hydrogen exchange material. This solution is passed through a bed or column of granular hydrogen exchange material, and the effluent portion of high betaine purity is carefully observed and taken off separately from the portion preceding and the portion of higher cation content that would follow. The somewhat enriched effluent portion also is isolated and then treated in another bed of hydrogen exchange material to obtain another betaine-rich fraction, if desired.

I then pass the acidic betaine-rich fraction or fractions through one or more beds or columns of granular anion exchange material, which may be any suitable substance of this class that possesses the quality of adsorbing acid ions from aqueous solutions and replacing them by an equivalent quantity of hydroxyl ions. The acids released in the betaine-containing portion through the action of the hydrogen exchange material are removed by the action of the anion exchange material, and a further purified, approximately neutral betaine solution is obtained as the effluent from the anion exchanger bed. This solution will usually have a purity of about 70 to 80% where the betaine purity of the original extract or aqueous solution was about 40 to 45%.

Upon crystallization of this purified solution, preferably by evaporation under reduced pressure, and separation of the crystals, substantially pure betaine hydrate may be recovered as the desired end product. Further crystallizations and separations may then be made to recover somewhat less pure, or crude, betaine crystals and a low purity mother liquor. The less pure crystals may be recrystallized for the recovery of pure betaine, and the mother liquor may be recirculated and retreated in the process, as by mixing it with the feed to the cation exchanger. The end product also may be recrystallized, if desired, to make it quite pure.

The hydrogen exchange materials presently available for the practice of this invention are carbonaceous and resinous zeolites, such as the substances sold under the trade names "Nalcite A" (by National Aluminate Corporation), "Catex" (by The International Filters Corporation), "Zeo-Karb" (by the Permutit Company) and "Amberlite I-R1" (by Resinous Products and Chemical Co., Inc.). The known anion exchange materials suitable for the process are resinous zeolites, for example, those sold under the trade names "Nalcite B" (by National Aluminate Corporation), "Anex" (by The International Filters Corporation), "Demineralite" (by the Permutit Company) and "Amberlite I-R4" (by the Resinous Products and Chemical Co., Inc.). Further information concerning these classes of materials appears in an article of Robert J. Myers et al., published in Industrial and Engineering Chemistry, vol. 33, pp. 697–706 (1941).

In practice, when the effluent from the cation exchanger bed shows approximately the same composition as the feed solution, the flow of solution through the original bed is discontinued, and a fresh bed preferably is put into service. Thereupon steps are taken to recover the residual solution in the original bed and then to regenerate the exchange material. For example, water is fed into the bed, and the liquid first displaced by the water preferably is passed through another cation exchanger bed with the somewhat enriched fraction that preceded it, until the wash liquid becomes diluted, say to about 10% to 12% dry matter. A dilute wash liquid is then obtained which is collected separately and may be used in place of water to dissolve dealcoholized extract. When the washing is complete the exchanger bed is regenerated in the same manner as zeolitic beds used for water treatment or the like. For example, a back-wash of water is used first to loosen the material and remove accumulated foreign matter. Next, a dilute acid solution, such as a 2 to 3% solution of sulfuric acid, is passed through the bed. The exchanger material takes up hydrogen ions from the acid in place of its adsorbed cations, the latter going off in the regeneration solution as sulfates. After a further washing with water to remove excess acid, the bed is left full of water and is again ready for use.

In the case of the anion exchange material, also, a state of saturation with anions occurs after a certain extent of adsorption from the solution under treatment, whereupon a fresh bed may be put into service and steps taken to recondition the saturated bed. In this case a dilute alkali solution is passed through the bed to regenerate the anion exchange material.

According to a second embodiment of my invention, I utilize the selective adsorption of hydrogen exchange materials together with other treatments to produce acid salts of betaine from Steffen or barium process waste water, substantially as follows: The waste water is treated as in the above described embodiment to produce an impure aqueous solution containing betaine and ash. This solution is passed through a bed of hydrogen exchange material, and the resulting effluent is separated so as to recover an acidic fraction of high betaine purity, substantially as already described.

Instead, however, of treating such betaine-rich solution with anion exchange material, I pass it from the cation exchanger to a treatment with activated carbon, which serves to remove coloring matter, other colloidal substances and a certain amount of acids. For example, finely divided activated carbon may be mixed with the solution, allowed to react and then filtered off and discarded; or the solution may be passed through a bed of activated carbon which, after becoming saturated with coloring matter, etc., may be regenerated in known manner, as by treating it with a solution of caustic soda, sodium carbonate or other suitable basic reagent.

The purified solution from the activated carbon treatment is then reacted with an acid which forms an acid salt with betaine, such as hydrochloric acid, sulfuric acid or phosphoric acid. Approximately one mol. of acid is added for each mol. of betaine in the solution, resulting in the conversion of substantially all of the betaine to the corresponding acid salt of betaine. The resulting salt solution is then crystallized, preferably by evaporation under reduced pressure, and upon separation of the crystals, by centrifuging or the like, the substantially pure acid salt of betaine is obtained.

The mother liquor separated from the first lot of crystals may be recrystallized, and so on, to obtain a second and a third lot of crystals of somewhat lower purity than the first and a low purity mother liquor separated from the third lot. These products may then be recirculated and retreated in the process, the low purity mother liquor being mixed with the feed to the cation exchanger bed and the crystals being redissolved and recrystallized, such as by addition to the purified solution entering the first stage of evaporation.

According to a third embodiment hereof, the process may be carried out as in the first embodiment, but with the difference that the betaine-rich fraction of the effluent from the cation exchanger is treated with activated carbon and then is subjected to the anion exchange treatment. This somewhat improves the quality of the final purified solution and reduces the requirements for anion exchange material, which is expensive. Betaine hydrate is again obtained as the end product.

The following examples further illustrate the practice of this invention: A waste water containing 15 to 18% of betaine on dry matter is evaporated to 80 to 85% dry substance and extracted with 95% pure ethyl alcohol. Two successive extractions are made in closed helical mixers, using about 18 gallons of alcohol per 100 pounds of concentrated waste water in each, and continuing each extraction for about one to two hours. By decantation, a thinly fluid extract is obtained, leaving behind a thick, viscous residue. The residue contains about 5% of the alcohol, which may be recovered by diluting the residue with water and distilling it through a rectifying column.

The extract contains about 40 to 45% of betaine on dry matter and about 30 to 35% of inorganic salts, the balance being nitrogenous and non-nitrogenous organic compounds. The alcohol solvent is distilled off, and the resulting de-alcoholized extract is diluted to form an aqueous solution of about 20% dry substance, as by adding water or the dilute wash liquid removed from the cation exchanger, or both. About 140 gallons of such a 20% solution, containing about 110 lbs. of betaine and about 80 lbs. of ash, may be obtained from each ton of waste water dry substance. That much solution requires about 24 cubic feet of granular hydrogen exchange material for an efficient treatment. On that basis, upon feeding the solution into a watered bed of the exchange material, the first fraction of the effluent to be separated will be about 80 to 85 gallons of displaced water, which may be discarded or used for washing. Next, about 50 to 60 gallons of betaine-rich solution is separated, containing about 35% of the betaine in the feed solution. The flow to this betaine-rich fraction is discontinued when its average ash content is about 10 to 15% of its betaine content. Next, about 80 to 90 gallons of a partially enriched fraction is obtained, which is passed through a second cation exchanger bed.

The original bed then being saturated with basic ions, wash water is fed in to displace the residual solution, which is passed through the second bed with the partially enriched fraction until the density of the wash liquid drops to about 10% to 12% dry matter. The remaining or final wash liquid is reserved for dissolving dealcoholized extract, and the washed, exhausted bed is then regenerated for further use.

The betaine-rich fraction obtained by the described procedure has a betaine purity of about 70 to 80%. By the further similar treatment of partially enriched fractions, a total recovery of such purified betaine solution is obtained which contains about 95 to 97% of the betaine but only about 5 to 10% of the ash present in the original alcoholic extract.

This purified, acidic solution is passed through a bed of granular anion exchange material, about as much of such material being used as hydrogen exchange material. A substantially neutral purified solution results, which is crystallized by evaporation under reduced pressure. Betaine hydrate of high purity is separated as the first product, by centrifuging or the like. Repeated crystallizations of mother liquor yield a second and a third lot of crystals and a low purity mother liquor. The less pure crystals are recrystallized for further purification, and the mother liquor is mixed with the feed to the cation exchanger.

For the recovery of betaine hydrochloride as the product, an aqueous solution containing betaine and ash is prepared and treated with hydrogen exchange material as just described, and the betaine-rich solution that is recovered is mixed and reacted with powdered activated carbon, such as "Darco" or "Super-Norit," in an amount equivalent to about 5% of the weight of the betaine in solution. The carbon is filtered off, and hydrochloric acid is added to the resulting solution in the ratio of one mol. of acid for each mol. of betaine. The solution is then evaporated under reduced pressure. Betaine hydrochloride crystallizes and is separated at a purity of about 98 to 99%. Repeated crystallizations, etc., are then carried out as described above. If desired, the first lot of crystals may be recrystallized to obtain a product of 99 to 100% purity. The recovery through this procedure represents about 90 to 95% of the betaine content of the alcoholic extract.

The invention herein disclosed possesses a number of advantages and gives several new results in practice. It may be practiced with the minimum use of acidproof equipment. Hydrogen chloride gas is not required. The purified betaine or betaine salt solutions as prepared for crystallization have a high betaine content and a low content of inorganic matter and other impurities, so that substantially pure products may be crystallized and separated without difficulty. Only an approximately stoichiometric proportion of acid is required for recovering the betaine as the corresponding acid salt of betaine, so that acid costs are substantially reduced as compared with prior processes. And a 90% to 95% yield of substantially pure betaine or betaine salt may be obtained, as compared with yields of 75% to 80% from prior processes.

While I have described several embodiments of my invention in considerable detail to exemplify its practical use, it is to be understood that the invention may be practiced in various other ways without departing from its contributions to the art, which are intended to be defined by the claims.

I claim:

1. In a process for the production of a compound from the group consisting of betaine and salts thereof, the steps which comprise passing an impure aqueous solution containing betaine and organic and inorganic impurities through a bed of granular hydrogen exchange material substantially saturated with hydrogen ions, and separating from the effluent and flowing onward for further treatment that portion of the effluent which is substantially richer in betaine than said aqueous solution.

2. In a process for the production of a compound from the group consisting of betaine and salts thereof, the steps which comprise passing an impure aqueous solution containing betaine and alkali metal salts through a bed of granular hydrogen exchange material substantially saturated with hydrogen ions, dividing off and flowing onward for further treatment that portion of the effluent which has an increased concentration of betaine as compared with said solution, discontinuing the flow of such portion when the effluent shows a materially increasing content of alkali metal cations, and dividing from the effluent that follows a portion thereof somewhat richer in betaine than said solution.

3. In a process for the production of a compound from the group consisting of betaine and salts thereof, the steps which comprise subjecting a sugar beet waste material containing betaine and substantially higher proportions of other organic and inorganic compounds to an alcohol extraction, distilling alcohol from the extract, forming a dilute aqueous solution of the de-alcoholized extract, passing said solution through a bed of hydrogen exchange material substantially saturated with hydrogen ions, and isolating from other portions of the effluent from the hydrogen exchange material a portion thereof which is substantially richer in betaine than said dilute solution.

4. A process for the recovery of betaine from sugar beet waste water which comprises concentrating the waste water, extracting the concentrated waste water with an alcohol, separating the extract and distilling alcohol therefrom, forming an aqueous solution of the de-alcoholized extract, passing said solution through a bed of hydrogen exchange material substantially saturated with hydrogen ions to produce a stream of treated solution of which a portion is substantially richer in betaine than said aqueous solution, isolating said richer portion, passing the same through a bed of anion exchange material to obtain an approximately neutral purified solution, and crystallizing and separating betaine hydrate from the purified solution.

5. A process for producing an acid salt of betaine from sugar beet waste water which comprises concentrating the waste water, extracting the concentrated waste water with an alcohol, separating the extract and distilling alcohol therefrom, forming an aqueous solution of the de-alcoholized extract, passing said solution through a bed of hydrogen exchange material substantially saturated with hydrogen ions to produce a stream of treated solution of which a portion is substantially richer in betaine than said aqueous solution, separating said richer portion from the remainder of said stream and treating the same with activated carbon to decolorize and further purify the same, reacting the further purified solution with an acid to form a solution of the corresponding acid salt of betaine, and crystallizing and separating the acid salt of betaine from the last-recited solution.

6. A process for the recovery of betaine from sugar beet waste water which comprises concentrating the waste water, extracting the concentrated waste water with an alcohol, separating the extract and distilling alcohol therefrom, forming an aqueous solution of the de-alcoholized extract, passing said solution through a bed of hydrogen exchange material substantially saturated with hydrogen ions to produce an effluent of which a portion is substantially richer in betaine than said aqueous solution, isolating said richer portion and treating the same with activated carbon, passing the effluent from the activated carbon treatment through a bed of anion exchange material to obtain an approximately neutral purified solution, and crystallizing and separating betaine hydrate from the purified solution.

7. A process for producing substantially pure betaine comprising extracting with ethyl alcohol a concentrated sugar beet waste water containing about 15 to 18% of betaine on dry matter, separating the extract and distilling alcohol therefrom, forming an aqueous solution of the de-alcoholized extract having about 20% of dry matter, passing said solution through a bed of hydrogen exchange material substantially saturated with hydrogen ions to produce an effluent of which a portion is substantially richer in betaine than said aqueous solution, separating said richer portion and passing the same through a bed of anion exchange material, and crystallizing and separating substantially pure betaine from the effluent from the anion exchange material.

8. A process for producing substantially pure betaine hydrochloride which comprises extracting with ethyl alcohol a concentrated sugar beet waste water containing about 15 to 18% of betaine on dry matter, separating the extract and distilling alcohol therefrom, forming an aqueous solution of the de-alcoholized extract having about 20% of dry matter, passing said solution through a bed of hydrogen exchange material substantially saturated with hydrogen ions to produce an effluent of which a portion is substantially richer in betaine than said aqueous solution, separating said richer portion and treating the same with activated carbon, reacting the effluent from the activated carbon treatment with hydrochloric acid in an approximately stoichiometric ratio to the betaine content thereof, and thereafter crystallizing and separating substantially pure betaine hydrochloride from the resulting solution.

9. In a process for the production of a compound from the group consisting of betaine and salts thereof, the steps which comprise extracting concentrated sugar beet waste water with an alcohol, separating the extract and distilling alcohol therefrom, adding water to the de-alcoholized extract to form a dilute aqueous solution containing betaine and ash, feeding said solution through a bed of granular hydrogen exchange material substantially saturated with hydrogen ions, isolating from the effluent from said bed a fraction thereof much richer in betaine than the feed solution for further purification and crystallization, next isolating the somewhat enriched effluent fraction that follows, for further treatment with similar hydrogen exchange material, discontinuing said feeding when the composition of the effluent approximates that of said solution, then feeding water through said bed, adding the denser solution first displaced by the water to said somewhat enriched fraction, and collecting a less dense solution which later is displaced by the water and employing the same in forming more of such dilute aqueous solution with de-alcoholized extract.

10. In a process for the production of a compound from the group consisting of betaine and salts thereof, the steps which comprise feeding an impure aqueous solution containing betaine and organic and inorganic impurities through a watered bed of granular hydrogen exchange material substantially saturated with hydrogen ions, first taking off the water displaced by the solution together with some solution from which betaine and cations have been adsorbed, next taking off separately a fraction of the effluent that is much richer in betaine than said solution, next taking off separately a fraction of the effluent that is somewhat enriched in betaine, discontinuing said feeding when the composition of the effluent approximates that of said solution, and thereafter displacing the residual solution from said bed with water.

11. In a process for the production of a compound from the group consisting of betaine and salts thereof, the steps which comprise feeding an impure aqueous solution containing about 40 to 45% of betaine on dry matter through a water filled bed of granular hydrogen exchange material substantially saturated with hydrogen ions, taking off a first effluent portion until the effluent shows an increasing content of betaine, then taking off separately the effluent that follows until a betaine-rich fraction is obtained containing about 10 to 15% as much ash as betaine, then taking off separately the following somewhat purified effluent fraction until the composition of the effluent approximates that of said solution, then discontinuing the aforesaid feeding and feeding wash water through the bed, taking off the liquid displaced by the wash water and combining the same with said somewhat purified fraction until the density of such liquid falls to about 10% to 12% dry matter, collecting separately the more dilute wash liquid that follows, and thereafter regenerating said bed.

ARTHUR N. BENNETT.